US012781700B2

(12) United States Patent
Delp et al.

(10) Patent No.: US 12,781,700 B2
(45) Date of Patent: Nov. 3, 2026

(54) SYSTEMS AND METHODS FOR PRECONDITIONING A WORK VEHICLE FOR OPERATION

(71) Applicant: Deere & Company, Moline, IL (US)

(72) Inventors: Ethan H. Delp, Dubuque, IA (US); Jake J. Baker, Dubuque, IA (US)

(73) Assignee: Deere & Company, Moline, IL (US)

( * ) Notice: Subject to any disclaimer, the term of this patent is extended or adjusted under 35 U.S.C. 154(b) by 122 days.

(21) Appl. No.: 18/901,775

(22) Filed: Sep. 30, 2024

(65) Prior Publication Data

US 2026/0092551 A1 Apr. 2, 2026

(51) Int. Cl.
*F02N 19/10* (2010.01)

(52) U.S. Cl.
CPC .......... *F02N 19/10* (2013.01); *F01P 2060/18* (2013.01)

(58) Field of Classification Search
CPC ..... F02N 19/04; F02N 19/10; F02D 2200/023
See application file for complete search history.

(56) References Cited

U.S. PATENT DOCUMENTS

| | | | |
|---|---|---|---|
| 3,877,639 A | 4/1975 | Wilson et al. | |
| 4,706,644 A | 11/1987 | Nakai | |
| 10,018,171 B1 | 7/2018 | Breiner et al. | |
| 10,119,487 B1 * | 11/2018 | Skiles | C07C 5/327 |
| 10,132,259 B1 | 11/2018 | Watson et al. | |
| 10,814,716 B2 | 10/2020 | Eberspach et al. | |
| 2012/0227378 A1 | 9/2012 | Koestler | |
| 2014/0299084 A1 | 10/2014 | Adams et al. | |
| 2022/0048472 A1 | 2/2022 | Nilsson et al. | |
| 2022/0397897 A1 | 12/2022 | Pandita et al. | |
| 2023/0366175 A1 | 11/2023 | Whiteman et al. | |

FOREIGN PATENT DOCUMENTS

| | | |
|---|---|---|
| CN | 109435637 A | 3/2019 |
| CN | 106347061 B | 11/2020 |
| WO | 2015047161 A1 | 4/2015 |

* cited by examiner

*Primary Examiner* — Eric S Ruppert
(74) *Attorney, Agent, or Firm* — Tucker Ellis LLP

(57) ABSTRACT

A vehicle preconditioning system automatically preconditions engine coolant in a work vehicle for operation of the work vehicle at a predetermined desired ready time. The system includes a coolant heating device wherein engine coolant is circulated between the coolant heating device and the engine via the conduits. A coolant temperature sensor determines a temperature of the engine coolant, and a minimum required lead time is determined for modifying a temperature of the engine coolant in the work vehicle from an initial temperature to a desired minimum temperature. The heating device is automatically controlled to initiate heating the engine coolant at a heater start time prior to the desired ready time by the minimum required lead time sufficient to heat the engine coolant to the desired minimum temperature for the work vehicle to be available for the operation at the predetermined desired ready time.

18 Claims, 6 Drawing Sheets

SYSTEMS AND METHODS FOR PRECONDITIONING A WORK VEHICLE FOR OPERATION

BACKGROUND

In the construction, agriculture, mining, and forestry industries, many different types of work vehicles are operated to perform various tasks at work sites. The work sites may be located in remote areas and in challenging climates. In some cold weather settings, deferring starting the work vehicle until the beginning of a work shift may result in delays and inefficiencies, for example, to properly warm the work vehicle before commencing productive operation. To address this, some current solutions include timer-based startup techniques wherein the work vehicles may be started automatically and permitted to idle in response to initiation at a designated timer or clock setting. Examples include on-board vehicle controllers that are programmable by an operator to start the vehicle at a selected time prior to the beginning of a work shift. In addition, remote vehicle starters can be used to automatically start a vehicle prior to the start of a work shift based on a setting stored in a controller that is in wireless communication with corresponding equipment disposed in the vehicle.

However, starting the work vehicle too far ahead of a work shift to ensure that the vehicle is sufficiently may result in unnecessarily wasted fuel use as the vehicle idles, and additional wear and tear on vehicle components on the vehicle or other components that support pre-operational readiness of the vehicle. In the other extreme, starting the work vehicle too close to the start of a work shift may result in delays and additional labor costs as work crews need to wait for the vehicle to warm to a suitable temperature for operation to be able to commence.

Diesel fired coolant heaters (DFCHs) have been used to automatically heat and circulate the coolant of a work vehicle for preparing the vehicle for use. Although these systems save on wasted vehicle fuel usage by using a heating system that is auxiliary to the main engine of the vehicle, they too have been initiated based on simple clock or timer settings resulting in wasted fuel, delays, and additional labor costs.

It would be advantageous to provide systems and methods for preconditioning a vehicle to be ready for operation at the start of a work shift or at other designated times, without the work shift delays, unnecessary fuel and labor costs, and extra wear and tear on vehicle components as described above.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

Systems and methods are described herein for preconditioning a work vehicle for operation at a designated time.

In an implementation, the systems and methods automatically precondition one or more fluids in a work vehicle for preparing the vehicle to be ready for operation at a designated ready time, such as at the beginning of a work shift for example.

In an implementation, the systems and methods automatically precondition a plurality of fluids in a work vehicle in a predetermined preconditioning sequence for preparing the vehicle to be ready for operation at a designated ready time, such as at the beginning of a work shift for example.

In an implementation, the systems and methods automatically precondition one or more fluids in a work vehicle by heating the fluid to a desired temperature for preparing the vehicle to be ready for operation at a designated ready time, such as at the beginning of a work shift for example.

In an implementation, the systems and methods automatically precondition one or more fluids in a work vehicle by cooling the fluid to a desired temperature for preparing the vehicle to be ready for operation at a designated ready time, such as at the beginning of a work shift for example.

In an implementation, the systems and methods automatically precondition engine coolant in a work vehicle by heating the coolant to a desired temperature for preparing the vehicle to be ready for operation at a designated ready time, such as at the beginning of a work shift for example.

In an implementation, the systems and methods automatically precondition engine coolant in a work vehicle by heating the coolant to a desired temperature for preparing the engine of the vehicle to be started so that in turn the vehicle transmission oil and/or other fluids of the vehicle may be heated or otherwise preconditioned for making the vehicle ready for operation at a designated ready time, such as at the beginning of a work shift for example.

In an implementation, the systems and methods automatically precondition engine coolant and oil in a work vehicle by heating the coolant and oil to a desired temperature for preparing the vehicle to be ready for operation at a designated ready time, such as at the beginning of a work shift for example.

In an implementation, the systems and methods automatically precondition air in an operator cab of a work vehicle that may include a seat and various controls, user interfaces, user inputs and outputs, and the like for operating vehicle by cooling the air within the cab to a desired temperature for preparing the vehicle to be ready for operation at a designated ready time, such as at the beginning of a work shift for example.

In accordance with an aspect, a vehicle preconditioning system is provided that is operable to automatically precondition engine coolant in a work vehicle, wherein the vehicle preconditioning system includes a coolant heating device, and a coolant heater start controller. The coolant heating device is coupled with an engine of the work vehicle via a supply conduit and a return conduit, wherein engine coolant is circulated between the coolant heating device and the engine via the conduits. The coolant heater start controller includes a start module in operative communication with the coolant heating device, a processor device, a non-transient memory device in operative communication with the processor device, and vehicle preconditioning logic stored in a non-transient memory device, wherein the processor device is operable to execute the vehicle preconditioning logic to automatically control the coolant heating device to initiate heating the engine coolant.

In accordance with an aspect, a vehicle preconditioning system is provided that is operable to automatically precondition engine coolant in a work vehicle for operation of the work vehicle at a predetermined desired ready time, wherein the vehicle preconditioning system includes a coolant heating device, a coolant temperature sensor, and a coolant heater start controller. The coolant heating device is coupled with an engine of the work vehicle via a supply conduit and a return conduit, wherein engine coolant is circulated between the coolant heating device and the engine via the conduits. The coolant temperature sensor is operable to determine a temperature of the engine coolant in the work vehicle. The coolant heater start controller includes a start module in operative communication with the coolant heating device, a processor device, a non-transient memory device in operative communication with the processor device, and vehicle preconditioning logic stored in a non-transient memory device. In accordance with the implementation, the processor device is operable to execute the vehicle preconditioning logic to determine a minimum required lead time for modifying a temperature of the engine coolant in the work vehicle from an initial temperature of the engine coolant to a desired minimum temperature, and automatically control the coolant heating device to initiate heating the engine coolant at a heater start time prior to the desired ready time by the minimum required lead time sufficient to heat the engine coolant to the desired minimum temperature for the work vehicle to be available for the operation at the predetermined desired ready time.

In accordance with any of the implementations, the vehicle preconditioning system further includes ready time data and desired minimum temperature data stored in the non-transient memory device operatively coupled with the processor device of the vehicle preconditioning system. The ready time data is representative of the predetermined ready time for operation of the work vehicle, and the desired minimum temperature data is representative of the desired minimum temperature.

In accordance with any of the implementations, the vehicle preconditioning system further includes a vehicle communication component configured to receive one or more of the ready time data and/or the desired minimum temperature data from an associated source comprising one or more of an operator of the work vehicle, a remote operation device in operative communication with the vehicle preconditioning system, and/or a remote center in operative communication with the vehicle preconditioning system.

In accordance with any of the implementations, the processor device of the vehicle preconditioning system is operable to execute vehicle preconditioning logic to determine the minimum required lead time by determining, during a prelude time period prior to the heater start time, the initial temperature of the engine coolant by one or more of a coolant temperature sensor and/or an ambient air temperature sensor operatively coupled with the processor device of the vehicle preconditioning system.

In accordance with any of the implementations, the processor device of the vehicle preconditioning system is operable to execute vehicle preconditioning logic to defer the automatically controlling the coolant heating device during the prelude time period to initiate the heating the engine coolant at the heater start time.

In accordance with any of the implementations, the processor device of the vehicle preconditioning system is operable to execute vehicle preconditioning logic to determine the minimum required lead time by determining the minimum required lead time based on a difference between the desired minimum temperature and the initial temperature, and a power transfer relationship between the engine coolant in the work vehicle and the coolant heating device, the power transfer relationship being representative of a time rate of energy transferred from the coolant heating device to the engine coolant in the work vehicle during operation of the coolant heating device.

In accordance with any of the implementations, the processor device of the vehicle preconditioning system is operable to execute vehicle preconditioning logic to determine, at the desired ready time, that the engine coolant in the work vehicle has reached the desired minimum temperature, and based on determining that the engine coolant in the work vehicle has reached the desired minimum temperature, control the coolant heating device to operate at a controlled heating level of operation to maintain the engine coolant in the work vehicle nominally at the desired minimum temperature.

In accordance with any of the implementations, the processor device of the vehicle preconditioning system is operable to execute vehicle preconditioning logic to select a heating level of operation of the coolant heating device based on one or more of a current time, the predetermined ready time, the initial temperature of the engine coolant, and/or the desired minimum temperature of the engine coolant. In accordance with any of the implementations, the determining the minimum required lead time includes determining the minimum required lead time based on a difference between the desired minimum temperature of the engine coolant in the work vehicle and the initial temperature of the engine coolant in the work vehicle, and a power transfer relationship between the engine coolant in the work vehicle and the coolant heating device in the selected heating level of operation, the power transfer relationship being representative of a time rate of energy transferred from the coolant heating device to the engine coolant in the work vehicle with the coolant heating device being operated while in the selected heating level of operation.

In accordance with any of the implementations, the processor device of the vehicle preconditioning system is operable to execute vehicle preconditioning logic to determine, at the desired ready time, that the engine coolant in the work vehicle has reached the desired minimum temperature, and based on determining that the engine coolant in the work vehicle has reached the desired minimum temperature, control the coolant heating device to operate at a controlled heating level of operation to maintain the engine coolant in the work vehicle nominally at the desired minimum temperature.

In accordance with any of the implementations, the processor device of the vehicle preconditioning system is operable to execute vehicle preconditioning logic to automatically control the coolant heating device by automatically controlling, by the processor of the vehicle preconditioning system, the coolant heating device to circulate the engine coolant at the heater start time between the coolant heating device and an engine of the work vehicle via a plurality of engine coolant conduits operatively coupling the coolant heating device with the engine of the work vehicle.

In accordance with an aspect, a method is provided for automatically preconditioning engine coolant in a work vehicle for operation of the work vehicle at a predetermined ready time, wherein a coolant heating device is automatically controlled to initiate heating the engine coolant to heat the engine coolant.

In accordance with an aspect, a method is provided for automatically preconditioning engine coolant in a work vehicle for operation of the work vehicle at a predetermined ready time. In accordance with an aspect, the method includes determining, by a processor device of a vehicle preconditioning system, a minimum required lead time for modifying a temperature of the engine coolant in the work vehicle from an initial temperature of the engine coolant to a desired minimum temperature, and automatically controlling, by the processor of the vehicle preconditioning system, a coolant heating device to initiate heating the engine coolant at a heater start time prior to the desired ready time by the minimum required lead time sufficient to heat the engine coolant to the desired minimum temperature for the work vehicle to be available for the operation at the predetermined ready time.

In accordance with any of the implementations, the method further includes storing ready time data in a non-transient memory device operatively coupled with the processor device of the vehicle preconditioning system, the ready time data being representative of the predetermined ready time for operation of the work vehicle, and storing desired minimum temperature data in the non-transient memory device of the vehicle preconditioning system, the desired minimum temperature data being representative of the desired minimum temperature.

In accordance with any of the implementations, the method further includes receiving, by the processor of the vehicle preconditioning system, one or more of the ready time data and/or the desired minimum temperature data from an associated source comprising one or more of an operator of the work vehicle, a remote operation device in operative communication with the vehicle preconditioning system, and/or a remote center in operative communication with the vehicle preconditioning system.

In accordance with any of the implementations, the determining the minimum required lead time of the method includes determining, during a prelude time period prior to the heater start time, the initial temperature of the engine coolant by one or more of a coolant temperature sensor and/or an ambient air temperature sensor operatively coupled with the processor device of the vehicle preconditioning system.

In accordance with any of the implementations, the method further includes deferring the automatically controlling the coolant heating device during the prelude time period to initiate the heating the engine coolant at the heater start time.

In accordance with any of the implementations, the determining the minimum required lead time of the method further includes determining the minimum required lead time based on a difference between the desired minimum temperature and the initial temperature, and a power transfer relationship between the engine coolant in the work vehicle and the coolant heating device, the power transfer relationship being representative of a time rate of energy transferred from the coolant heating device to the engine coolant in the work vehicle during operation of the coolant heating device.

In accordance with any of the implementations, the method further includes determining, at the desired ready time, that the engine coolant in the work vehicle has reached the desired minimum temperature, and based on determining that the engine coolant in the work vehicle has reached the desired minimum temperature, controlling the coolant heating device to operate at a controlled heating level of operation to maintain the engine coolant in the work vehicle nominally at the desired minimum temperature.

In accordance with any of the implementations, the method further includes selecting a heating level of operation of the coolant heating device based on one or more of a current time, the predetermined ready time, the initial temperature of the engine coolant, and/or the desired minimum temperature of the engine coolant. In accordance with any of the implementations, the determining the minimum required lead time includes determining the minimum required lead time based on a difference between the desired minimum temperature of the engine coolant in the work vehicle and the initial temperature of the engine coolant in the work vehicle, and a power transfer relationship between the engine coolant in the work vehicle and the coolant heating device in the selected heating level of operation, the power transfer relationship being representative of a time rate of energy transferred from the coolant heating device to the engine coolant in the work vehicle with the coolant heating device being operated while in the selected heating level of operation.

In accordance with any of the implementations, the method further includes determining, at the desired ready time, that the engine coolant in the work vehicle has reached the desired minimum temperature, and based on determining that the engine coolant in the work vehicle has reached the desired minimum temperature, controlling the coolant heating device to operate at a controlled heating level of operation to maintain the engine coolant in the work vehicle nominally at the desired minimum temperature.

In accordance with any of the implementations, the automatically controlling the coolant heating device of the method includes automatically controlling, by the processor of the vehicle preconditioning system, the coolant heating device to circulate the engine coolant at the heater start time between the coolant heating device and an engine of the work vehicle via a plurality of engine coolant conduits operatively coupling the coolant heating device with the engine of the work vehicle.

BRIEF DESCRIPTION OF THE DRAWINGS

The above-mentioned and other features and advantages of this disclosure, and the manner of attaining them, will become more apparent and the implementations themselves will be better understood by reference to the following description of embodiments of the implementations taken in conjunction with the accompanying drawings.

Like reference symbols in the various drawings indicate like elements.

DETAILED DESCRIPTION

Figure 1:
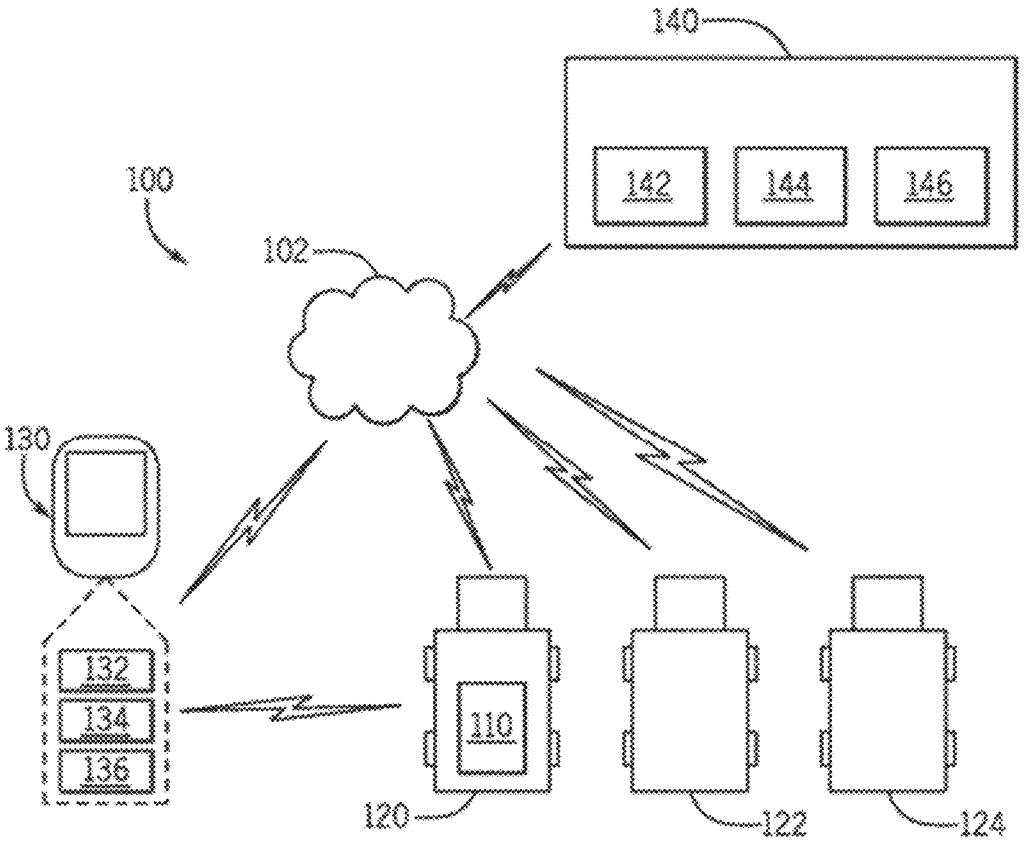
FIG. 1 is a schematic view of an environment in which the disclosed vehicle preconditioning system and method may be associated in accordance with an example embodiment.

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

The following describes one or more example implementations of the disclosed automatic vehicle preconditioning systems and methods for preparing a work vehicle to be ready for operation at a designated ready time, such as at the beginning of a work shift, as shown in the accompanying figures of the drawings described briefly above. Generally, the disclosed systems and methods (and work vehicles in which they may be implemented) provide for improved efficiency, operation, and safety as compared to conventional systems. Various modifications to the example embodiments may be contemplated by one of skill in the art.

FIG. 1 is an example vehicle preconditioning environment or framework 100 in which a vehicle preconditioning system and method may be implemented. In particular, a vehicle preconditioning system 110 for preparing a work vehicle to be ready for operation at a designated ready time is depicted in FIG. 1 as being associated with a work vehicle 120, although one or more functions of the vehicle preconditioning system 110 may be performed by, or otherwise cooperate with, other elements of the framework 100. In some examples, the vehicle preconditioning system (or "preconditioning system" or "conditioning system") 110 may be considered a remote vehicle preconditioning system in that some of the aspects or all of the aspects of the preconditioning operation may occur when the vehicle operator is not in the vehicle 120. Further, in some examples, the vehicle preconditioning system 110 may be considered an automated vehicle preconditioning system in that some of the aspects or all of the aspects of the preconditioning operation may occur automatically when the vehicle operator is not in the vehicle 120.

As described in greater detail below, the vehicle preconditioning system 110 may interact with one or more additional work vehicles 122, 124. In addition, and as described in greater detail below, the vehicle preconditioning system 110 may interact with one or more of a remote operation device 130, and/or a remote center 140 to facilitate operation. Again, although depicted in work vehicle 120, in various embodiments, the vehicle preconditioning system 110 may be incorporated into the other work vehicles 122, 124, in the remote operation device 130, and/or in the remote center 140. In various embodiments, the vehicle preconditioning system 110 may further be incorporated into more than one of the work vehicles 120, 122, 124, the remote operation device 130, and/or the remote center 140 (e.g., as a distributed system); or as a stand-alone system in one or more of the work vehicles 120, 122, 124, the remote operation device 130, and/or the remote center 140. In various embodiments, the vehicle preconditioning system 110 may comprise one or more of the functionalities and/or the devices or systems of the preconditioning framework 100 in general including for example the remote operation device 130 and/or the remote center 140. That is, in an embodiment the vehicle preconditioning system 110 comprises one or more of the remote operation device 130 and/or the remote center 140.

Generally, the other work vehicles 122, 124 may be considered in the context of the vehicle preconditioning system 110 as cooperating work vehicles 122, 124 or as part of a fleet of work vehicles that work at a site together with the work vehicle 120. The remote operation device 130 may be utilized by a future operator of the work vehicle 120 to remotely precondition and/or verify a remote preconditioning of the work vehicle 120. The remote center 140 may be utilized by a manager of the fleet of work vehicles 120, 122, 124 to remotely set up the vehicle preconditioning and/or to verify a remote preconditioning of the work vehicle 120 on behalf of a future operator. As such, the remote operation device 130 is discussed below with reference to an operator, and the remote center 140 is discussed below with reference to a manager, although in any of the embodiments, a manager may use the remote operation device 130 and an operator may use the remote center 140.

The elements of the vehicle preconditioning framework 100 may wirelessly communicate with one another in any suitable manner, including directly (e.g., via Bluetooth, radio frequency signals, or the like) or via network 102. For example, the communication network 102 may utilize one or more of various communication techniques or mechanisms, including radio frequency, Wi-Fi, cellular, or the like. Further details about communication standards are provided below. The network 102 may include or otherwise cooperate with the JDLink™ system commercially available from Deere & Company of Moline, Ill.

The work vehicle 120 may be any type of work vehicle, including any type of construction vehicle such as an articulated dump truck described in greater detail below with reference to FIG. 2. In other applications, other configurations are also possible. For example, work vehicles in some embodiments may be configured as haulers or loaders, graders, or similar vehicles. Further, work vehicles may be configured as machines other than construction machines, including vehicles from the agriculture, forestry and mining industries, such as tractors, combines, harvesters, yarders, skylines, feller bunchers, and so on.

As introduced above, the work vehicle 120 may be part of a fleet with other vehicles 122, 124, two of which are shown in FIG. 1 as examples. The work vehicles 122, 124 may have separate vehicle preconditioning systems similar to the preconditioning system 110 described below and/or may interact with the preconditioning system 110 associated with work vehicle 120. The fleet of work vehicles 120, 122, 124 may be any type of work vehicle, including the same type or different types of work vehicles. Additional details will be provided below.

The vehicle preconditioning system 110 may interact with the remote operation device 130. Typically, the remote operation device 130 is associated with a future operator of the work vehicle 120 at a location remote from the work vehicle 120. Although not shown in detail, the remote operation device 130 may be any type of electronic device communicating with the vehicle preconditioning system 110, such as a tablet computing device, mobile or smart cellular phone, personal digital assistant, a laptop computing device, etc. In some cases, the remote operation device 130 may be stationary device, such as a terminal. In further examples, the remote operation device 130 may be incorporated into or otherwise located at the remote center 140 discussed below.

In one example, the remote operation device 130 includes a device controller 132, a device user interface 134 and a device communication component 136. The device controller 132 may be configured as a computing device with associated processor devices and memory architectures, as a hard-wired computing circuit (or circuits), as a programmable circuit, or otherwise. In some examples, the device controller 132 may be implemented on a mobile application executed by a mobile device. The device controller 132 is in communication with the device user interface 134 and the device communication component 136 over a suitable interconnection architecture or arrangement that facilitates transfer of data, commands, power, etc. In some examples, the device controller 132 may store a unique identifier associated with the remote operation device 130, and thus, the operator.

The device user interface 134 allows the operator or other users to interface with the remote operation device 130 (e.g. to input commands and data), and thus, to interact with other aspects of the vehicle preconditioning framework 100. In one example, the device user interface 134 includes an input device and a display. The input device is any suitable device capable of receiving user input, including, but not limited to, a keyboard, a microphone, a touchscreen layer associated with the display, or other suitable device to receive data and/or commands from the user. Multiple input devices can also be utilized. The display comprises any suitable technology for displaying information, including, but not limited to, a liquid crystal display (LCD), light emitting diode (LED), organic light emitting diode (OLED), plasma, or a cathode ray tube (CRT). In some embodiments, the device user interface 134 may include output devices in addition to the display, including speakers and haptic actuators.

The device communication component 136 comprises any suitable system for receiving data from and transmitting data to the work vehicle 120, the remote center 140, and/or the vehicle preconditioning system 110. For example, the device communication component 136 may include a radio or suitable receiver configured to receive data transmitted by modulating a radio frequency (RF) signal via a cellular telephone network according to the long-term evolution (LTE) standard, although other techniques may be used. For example, the device communication component 136 may achieve bi-directional wireless communications with the work vehicle 120, remote center 140, and/or vehicle preconditioning system 110 over Bluetooth® or by utilizing a Wi-Fi standard, i.e., one or more of the 802.11 standards as defined by the Institute of Electrical and Electronics Engineers ("IEEE"), as is well known to those skilled in the art. Thus, the device communication component 136 may include a Bluetooth® transceiver, a radio transceiver, a cellular transceiver, an LTE transceiver and/or a Wi-Fi transceiver. The device communication component 136 may employ various security protocols and techniques to ensure that appropriately secure communication takes place between the remote operation device 130 and the work vehicle 120, remote center 140, and/or the vehicle preconditioning system 110.

As described below, the remote operation device 130 is generally configured to allow the operator to set up or otherwise plan or enable an automatic preconditioning function of the vehicle preconditioning start system 110. The remote operation device 130 is also configured to allow the operator to disable the automatic preconditioning function of the vehicle preconditioning start system 110. In some examples, the remote operation device 130 further enables the operator to initiate a remote preconditioning, and/or to verify that an automated remote preconditioning is appropriate, and thus, to approve or deny an initiated remote preconditioning, and/or to verify that an automated remote preconditioning operation has properly initiated. In some examples, the remote operation device 130 further enables the operator to monitor remote preconditioning that was previously initiated, and/or to monitor or verify that an automated remote preconditioning is being executed or otherwise performed on schedule and at nominal performance parameters, and without any malfunctions, alarms, or the like.

As introduced above, the vehicle preconditioning system 110 may further cooperate with the remote center 140, or in some embodiments, be implemented in the remote center 140. Alternatively, the remote center 140 may be omitted.

Generally, the remote center 140 includes a remote communication component 142, a remote center controller 144, and one or more remote data stores 146. The remote communication component 142 comprises any suitable system for receiving data from and transmitting data to the work vehicles 120, 122, 124, the remote operation device 130, and/or the vehicle preconditioning system 110, including those described above with reference to the device communication component 136. For example, the remote communication component 142 may achieve bi-directional communications with the work vehicles 120, 122, 124, the remote operation device 130, and/or the vehicle preconditioning system 110 over Bluetooth®, satellite, or by utilizing a Wi-Fi standard, i.e., one or more of the 802.11 standards. The remote communication component 142 may employ various security protocols and techniques to ensure that appropriately secure communication takes place between remote center 140 and the work vehicles 120, 122, 124, the remote operation device 130, and/or vehicle preconditioning system 110.

The remote center controller 144 is in communication with the remote communication component 142 and the one or more remote data stores 146 over a suitable interconnection architecture or arrangement that facilitates transfer of data, commands, power, etc. The remote center controller 144 may also be in communication with one or more remote users via a portal, such as a web-based portal. The remote center controller 144 may be configured as a computing device with associated processor devices and memory architectures, as a hard-wired computing circuit (or circuits), as a programmable circuit, or otherwise.

As noted above, in one embodiment, the remote center 140 may implement one or more aspects of the vehicle preconditioning system 110 described below, including providing requested or desired data for carrying out the associated functions. In further embodiments, the remote center 140 receives and stores data from the work vehicles 120, 122, 124, the remote operation device 130, and/or the vehicle preconditioning system 110, as well as from similar machines, devices, and systems from across a fleet or workforce. Additionally, the remote center 140 is generally configured to allow the manager to enable and disable the automatic preconditioning function of the vehicle preconditioning start system 110. In some examples, the remote center 140 further enables the manager to initiate a preconditioning and/or to verify that a remote preconditioning is appropriate, and thus, to approve or deny an initiated remote preconditioning.

Figure 2:
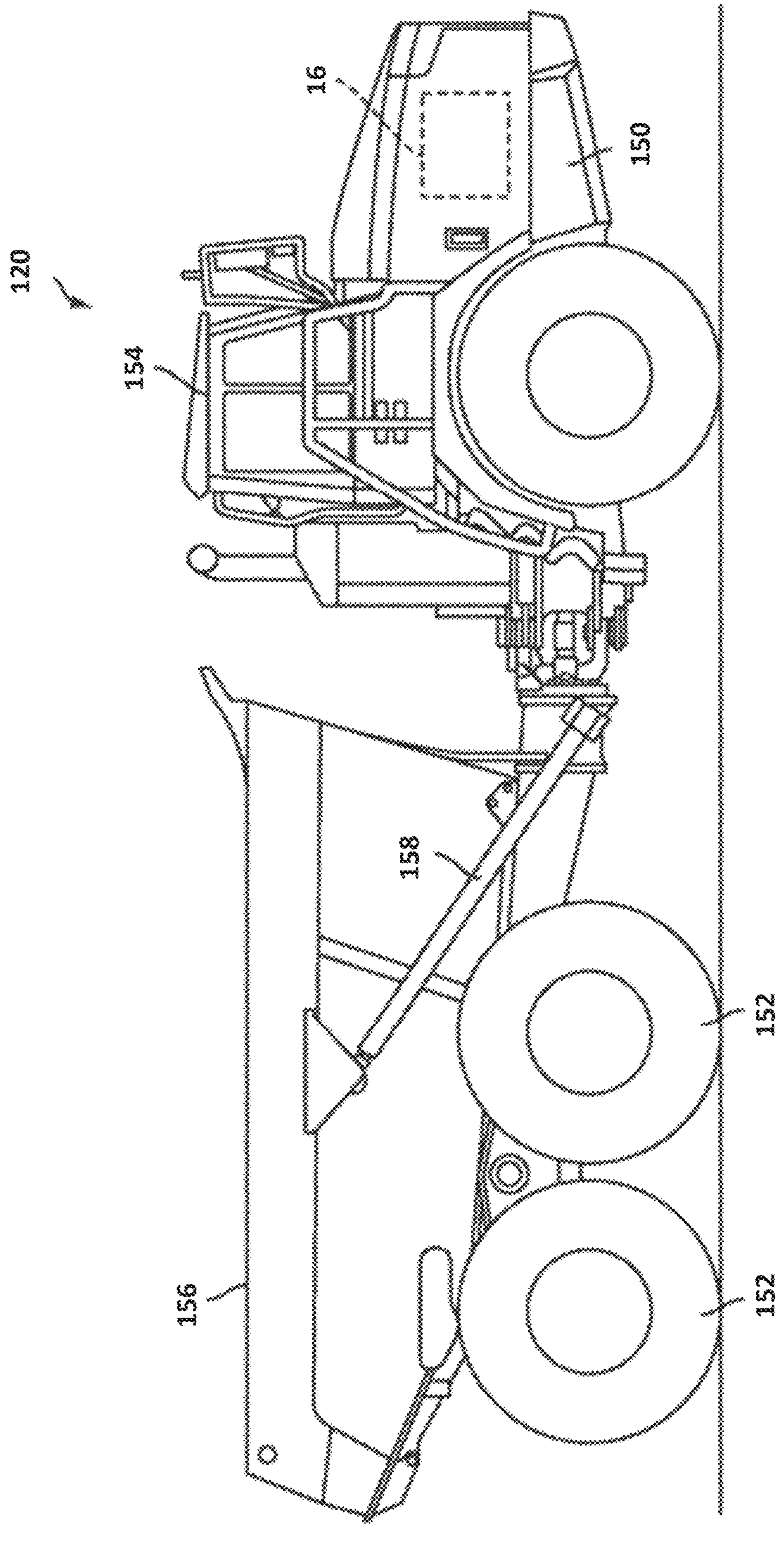
FIG. 2 is an elevational view of an exemplary work vehicle of the present disclosure in accordance with an example embodiment.

FIG. 2 illustrates a work vehicle 120 in the form of an articulated dump truck. Although vehicle 120 is shown and described herein as an articulated dump truck, vehicle 120 may also be in the form of a loader, a bulldozer, a motor grader, an excavator, or another construction, agricultural, or utility vehicle, for example. For example, work vehicles 120 in some embodiments may be configured as haulers or loaders, graders, or similar vehicles. Further, work vehicles may be configured as machines other than construction machines, including vehicles from the agriculture, forestry and mining industries, such as tractors, combines, harvesters, yarders, skylines, feller bunchers, and so on.

Vehicle 120 includes chassis 150. One or more traction devices 152 illustratively a plurality of wheels, are provided to support chassis 150 on the ground. Although traction devices 152 are in the form of wheels in FIG. 2, it is also within the scope of the present disclosure that traction devices 152 may be in the form of tracks, for example. Vehicle 120 also includes an engine 16 (shown in phantom in FIG. 2), such as a diesel internal combustion engine, that communicates with traction devices 152 via transmissions, transfer cases, and the like to propel chassis 150 across the ground.

Vehicle 120 also includes an operator cab 154 supported by chassis 150 to house and protect the operator of vehicle 120. Operator cab 154 may include a seat and various controls, user interfaces, user inputs and outputs, and the like for operating vehicle 120.

Vehicle 120 may further include one or more work tools moveably coupled to chassis 150. In the illustrated embodiment of FIG. 2, vehicle 120 includes a bed 156 that is moveably coupled to chassis 150 to receive, transport, and dump dirt and other materials. Other suitable work tools include, for example, buckets, blades, forks, tillers, and mowers. One or more hydraulic actuators or cylinders 158 may be provided to move bed 154 relative to chassis 150.

Figure 3:
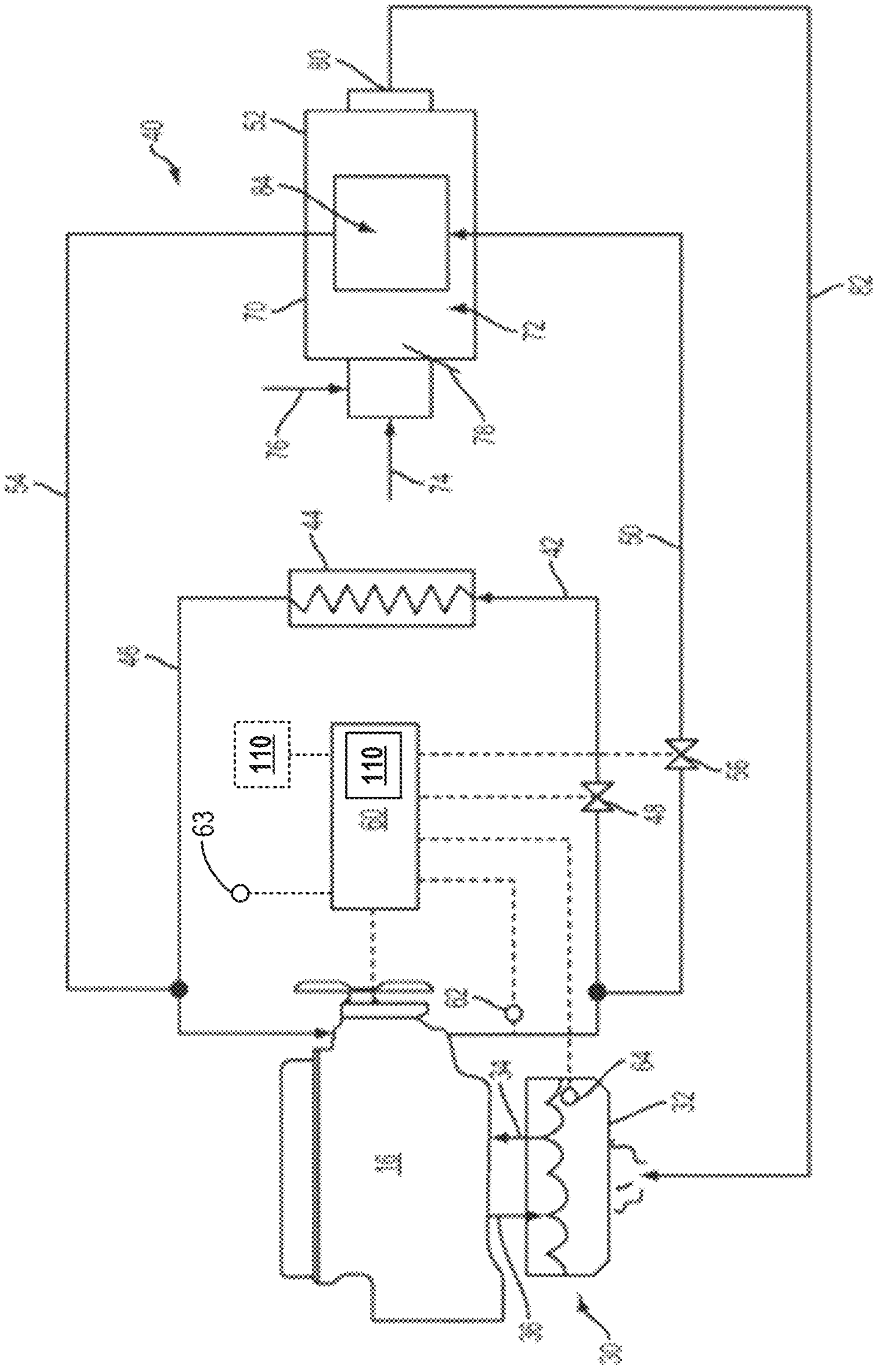
FIG. 3 is a schematic view of an engine, an engine lubrication system, and an engine cooling system for the work vehicle of FIG. 2 in accordance with an example embodiment.

Referring next to FIG. 3, an engine lubrication system 30 and an engine cooling system 40 are provided for a vehicle power source illustrated as an internal combustion engine 16 of vehicle 120. A controller 60 having a suitable microprocessor device operatively coupled with a non-transient memory device is also provided in FIG. 3 for controlling operation of the engine 16, the engine lubrication system 30, and/or the engine cooling system 40. The controller 60 may be an electronic control module (ECM) of the work vehicle 120, for example. In the implementation shown, the vehicle preconditioning system 110 is integrated within the vehicle controller 60 as illustrated in the FIGURE. However, it is to be appreciated that the vehicle preconditioning system 110 may be provided separately from the vehicle controller 60. In any of the implementations, the vehicle preconditioning system 110 is in operative communication with the vehicle controller 60 for receiving temperature signals and the like from the vehicle controller 60. This implementation is illustrated in FIG. 3 with the vehicle preconditioning system 110 being shown in dotted line format. As an example, the vehicle preconditioning system 110 may be provided as a retrofit kit to work vehicles that are already in service and, as such, are provided separately from the vehicle controller 60, and in operative communication with the vehicle controller 60.

In any case, the vehicle preconditioning system 110 whether being integrated within the vehicle controller 60 or provided separately from the vehicle controller 60, it is in operative communication with the vehicle controller 60, wherein the vehicle preconditioning system 110 may also control selected functions of the vehicle controller 60 by delegation of control of those functions to the vehicle preconditioning system 110 for purposes relating to automatically preconditioning fluids of the vehicle for preparing the vehicle to be ready for operation at a designated ready time, such as at the beginning of a work shift for example.

In an example implementation the vehicle preconditioning system 110 may be provided as vehicle preconditioning logic stored in a non-transient memory device of the vehicle controller 60. The vehicle preconditioning logic may be provided as a software update to the vehicle controller 60. This is convenient for vehicle controllers 60 that are equipped with adequate communication, sensor interface, and control capabilities.

The illustrative engine lubrication system 30 circulates a liquid lubricant (e.g., engine oil) around engine 16 to lubricate various moving parts (e.g., pistons, cylinders, bearings) of engine 16. In addition to lubricating the engine 16, the engine oil may also clean engine 16, inhibit corrosion of engine 16, and improve sealing of engine 16, for example. In FIG. 3, engine lubrication system 30 illustratively includes an oil reservoir, sump, or pan 32 that holds the engine oil. Pan 32 may be located beneath engine 16, as shown in FIG. 3, or in another suitable location. Engine lubrication system 30 also includes a first conduit 34 that directs the engine oil from pan 32 to engine 16, and a second conduit 36 that returns the engine oil from engine 16 to pan 32.

The illustrative engine cooling system 40 circulates a liquid coolant (e.g., glycol, water) around engine 16 to control the temperature of engine 16. Engine cooling system 40 may also be referred to herein as an engine temperature control system. Engine cooling system 40 may be selectively operated in a preconditioning or warm-up mode, and/or in an operational mode after engine startup using controller 60. The preconditioning or warm-up mode and the operational mode are described further below.

In FIG. 3, a first temperature sensor 62 measures the temperature of the coolant, a second temperature sensor 63 measures ambient outdoor temperature of the environment surrounding the vehicle, and a third temperature sensor 64 measures the temperature of the engine oil. The location of each temperature sensor 62, 63, 64, may vary. Additional temperature sensors may also be provided to measure the temperature of other components of vehicle 10. The vehicle preconditioning system 110 operatively coupled with the controller 60 may receive temperature readings from one or more temperature sensors 62, 63, 64, and may control functions of the work vehicle 120 including for example controlling the engine 16, the engine cooling system 40, and/or other components of the vehicle such as coolant fluid heaters, engine oil heaters, and other systems, for example, based on the temperature readings, as discussed further below. In an example implementation the one or more temperature sensors 62, 63, 64 may be in operative communication directly with the vehicle preconditioning system 110.

In the operational mode of the work vehicle, the liquid coolant may be circulated from engine 16, through a first conduit 42, through a cooler 44 (e.g., a radiator), through a second conduit 46, and back to engine 16. When the coolant travels across engine 16, the coolant absorbs heat from engine 16 to cool engine 16. When the coolant travels through cooler 44, the coolant releases heat into an ambient air stream or another suitable heat exchange medium traveling across cooler 44. The coolant may be sufficiently cooled in cooler 44 to absorb more heat from engine 16. In addition to cooling the coolant, cooler 44 may have various compartments to cool other fluids of vehicle 10, such as the lubricant that lubricates engine 16, brake fluid, the hydraulic fluid that operates cylinders 158 (FIG. 2), hydraulic fluid that operates other working members of the vehicle, and the like, for example.

Controller 60 may operate engine cooling system 40 in the operational mode when the coolant is at or above a predetermined run temperature. The predetermined run temperature may be about 75° C., 80° C., 85° C., 90° C., or more. The coolant may be at or above the predetermined run temperature when engine 16 is running at full speed to operate vehicle 10. As long as the surrounding environment is relatively warm, the coolant may remain at or above the predetermined run temperature even when vehicle 10 is turned off. Controller 60 may operate engine cooling system

40 in the operational mode by opening a valve 48 along first conduit 42, for example. Controller 60 may also communicate with a radiator fan (not shown) to control the cooling that takes place in cooler 44 during the operational mode.

In the preconditioning or vehicle pre-use warm-up mode, the liquid coolant may be circulated from engine 16, through a third conduit 50, through a coolant heating device 52, through a fourth conduit 54, and back to engine 16. The coolant may be heated in coolant heating device 52 and then returned to engine 16 to also heat engine 16.

In an example implementation, the vehicle preconditioning system 110 in operative communication with the controller 60 may, in response to one or more signals from the ambient air and coolant temperature sensors 63, 62 operate engine cooling system 40 in the preconditioning or warm-up mode when the coolant is below a desired minimum temperature and/or when the sensed ambient air is below a predetermined minimum temperature. The coolant may drop below the desired minimum temperature when vehicle 10 is turned off, especially when the surrounding environment is relatively cold. In extremely cold environments, it is within the scope of the present disclosure that the temperature of the jobsite as determined for example by the ambient temperature sensor 63 may drop as low as about 0° C., −10° C., −20° C., −30° C., or −40° C., for example. In such situations, the temperature of the coolant as measured by the coolant temperature sensor 62 is usually nominally the same or equivalent to the measured outside air temperature. The vehicle preconditioning system 110 and methods described herein advantageously provide an automatic preconditioning function for preconditioning a vehicle to be ready for operation at the start of a work shift or other designated time. In an implementation, the vehicle preconditioning system 110 and methods described herein provide the automatic preconditioning function based in part on temperature signals received from one or more of the ambient air and/or coolant temperature sensors 63, 62 for preconditioning a vehicle.

The time required to heat the coolant to the desired minimum temperature in the preconditioning or warm-up mode may be as short as about 50 minutes, 30 minutes, or 10 minutes, and as long as about 1 hour, 2 hours, or more, for example. The vehicle preconditioning system 110 in operative communication with the controller 60 may operate or otherwise control the coolant heating device 52 in coordination with the engine cooling system 40 in the preconditioning or warm-up mode by initiating operation of the coolant heating device 52 and opening a valve 56 along the third conduit 50, for example. Controlling the engine cooling system 40 in the preconditioning or warm-up mode, such as by opening valve 56, may involve terminating the other operational mode, such as by closing valve 48, and vice versa. The vehicle preconditioning system 110 may also communicate with coolant heating device 52 in response to one or more signals to control the heating that takes place in coolant heating device 52.

An exemplary coolant heating device 52 for use in engine cooling system 40 is a diesel-fired coolant heater (DFCH). Such coolant heaters are described for example in U.S. Pat. No. 4,099,488 to Damon and U.S. Pat. No. 4,381,742 to Funk, the disclosures of which are expressly incorporated herein by reference in their entirety.

The illustrative coolant heating device 52 of FIG. 3 includes a housing 70 that defines a combustion chamber 72. Coolant heating device 52 includes a fuel inlet 74 into combustion chamber 72, an air inlet 76 into combustion chamber 72, an ignition source 78 (e.g., a spark plug), and a combustion outlet 80 from combustion chamber 72. Fuel inlet 74 may be coupled to a fuel source (not shown), such as a diesel fuel source, a gasoline fuel source, an ethyl ether fuel source, or another suitable fuel source. Air inlet 76 may receive ambient air from around vehicle 10. In use, ignition source 78 may supply electrical energy to coolant heating device 52 to initiate an exothermic combustion reaction in combustion chamber 72 between the fuel from fuel inlet 74 and the air from air inlet 76. Together, the fuel from fuel inlet 74, the air from air inlet 76, and the electrical energy from ignition source 78 may serve as a thermal energy source. Gaseous combustion products (e.g., carbon dioxide, water vapor) may form inside combustion chamber 72 of coolant heating device 52 to serve as a heat exchange medium. The gaseous combustion products may exit combustion chamber 72 through combustion outlet 80 and may be carried away through an exhaust passageway or conduit 82.

The illustrative coolant heating device 52 of FIG. 3 also includes a coolant heating chamber 84 in thermal communication with the gaseous combustion products inside combustion chamber 72. Coolant heating chamber 84 communicates with third conduit 50 and fourth conduit 54 to direct the coolant through coolant heating device 52. In this arrangement, third conduit 50 serves as a coolant inlet into coolant heating chamber 84, and fourth conduit 54 serves as a coolant outlet from coolant heating chamber 84. In operation, the gaseous combustion products in combustion chamber 72 exchange heat with the coolant in coolant heating chamber 84 to heat the coolant. Stated differently, thermal energy generated by the exothermic combustion reaction in combustion chamber 72 is transferred to the coolant in coolant heating chamber 84 to heat the coolant.

The vehicle preconditioning system 110 may operate the coolant heating device 52 in one or more discrete power setting modes wherein each power setting mode selects a heating level of operation of the coolant heating device 52 for delivering heat energy to the coolant at a rate sufficient to modify a temperature of the engine coolant in the work vehicle from an initial temperature to a desired minimum temperature to be ready for operation at a designated ready time. In an implementation, the vehicle preconditioning system 110 may control the heat energy being delivered to the coolant by operating a coolant heating device 52 having a variable or controllable power setting by using a pulse width modulation (PWM) technique wherein a signal is delivered to the coolant heating device 52 to turn ON for a 0-100% portion of a predetermined PWM time period, and wherein an opposite signal is delivered to the coolant heating device 52 to turn OFF for the 0-100% remainder portion of a predetermined PWM time period.

In a further implementation, the vehicle preconditioning system 110 may control the heat energy being delivered to the coolant by operating a coolant heating device 52 having multiple power settings using appropriate signaling between the vehicle preconditioning system 110 and the coolant heating device 52. As an example, a DFCH coolant heating device 52 may have six (6) power settings including a POWER heating level of operation for delivering about 42,000 BTUs to the engine coolant, a HIGH heating level of operation for delivering about 32,400 BTUs to the engine coolant, a MEDIUM_1 heating level of operation for delivering about 17,000 BTUs to the engine coolant, a MEDIUM_2 heating level of operation for delivering about 12,000 BTUs to the engine coolant, a MEDIUM_3 heating level of operation for delivering about 5,000 BTUs to the engine coolant, and a LOW heating level of operation for delivering about 4,000 BTUs to the engine coolant.

In addition to the above it is further to be appreciated that the temperature of the engine oil in pan 32 of engine lubrication system 30 may also drop below an acceptable operating temperature, especially when vehicle 10 is turned off in a cold environment. If the temperature of the engine oil is too low, the engine oil may not properly lubricate engine 16. As a result, the starter motor (not shown) and other components of engine 16 may experience high friction and high torque loads. Also, engine 16 may be unable to reach an acceptable oil pressure, which may damage turbochargers (not shown) and other components of engine 16, for example.

The gaseous combustion products that were used to heat the coolant in coolant heating device 52 may still be relatively hot, with temperatures ranging from about 200° C. to about 250° C. or more. Before discharging the hot combustion products from vehicle 10 and into the surrounding atmosphere, the hot combustion products may be used as a heating source for a second time to heat other fluids or components of vehicle 10 during the warm-up mode. Using the hot combustion products from the coolant heating device 52 as a heating source for a second time takes advantage of an otherwise-wasted energy stream. Also, using the hot combustion products from the coolant heating device 52 as a heating source improves the efficiency of engine cooling system 40 without significantly increasing the cost of manufacturing or operating engine cooling system 40.

According to an exemplary embodiment of the present disclosure, the hot combustion products from exhaust conduit 82 of coolant heating device 52 may used to preheat the engine oil in pan 32 of engine lubrication system 30 during the preconditioning or warm-up mode. Preheating the engine oil in pan 32 may protect engine 16 and ensure a successful start-up of engine 16 by preventing oil starvation and by encouraging pressure development of the engine oil within an acceptable period of time, especially when operating vehicle 10 in an extremely cold environment. For example, preheating the engine oil in pan 32 may ensure adequate oiling of turbocharger bearings (not shown). In this embodiment, the hot combustion products of the coolant heating device 52 may first heat the coolant (via coolant heating chamber 84) and then be used to heat the engine oil (via exhaust conduit 82) during the preconditioning or warm-up mode. The time required to adequately heat the coolant and the engine oil in the warm-up mode may be as short as about 10 minutes, 30 minutes, or 50 minutes, and as long as about 1 hour, 2 hours, or more, for example.

By using hot combustion products as the heating source for the engine oil, work vehicle 120 may maintain separation between the liquid engine oil and coolant streams. In other words, vehicle 120 may avoid any heightened risk of cross-contamination or leakage between the liquid engine oil and coolant streams. Thus, the integrity of engine lubrication system 30 and engine cooling system 40 may be maintained without requiring additional seals or controls, for example.

As discussed above, the vehicle preconditioning system 110 in operable communication with the controller 60 may operate engine cooling system 40 in the preconditioning or warm-up mode based on temperature readings from one or more temperature sensors 62, 63, 64. In addition and in accordance with a further implementation, the vehicle preconditioning system 110 may operate engine cooling system 40 in the preconditioning or warm-up mode based on weather forecast information obtained via communication with the vehicle controller 60 and/or other devices in operable communication with the vehicle preconditioning system 110.

In one implementation using solely the coolant temperature sensor 62, the vehicle preconditioning system 110 in operable communication with the controller 60 may operate engine cooling system 40 in the preconditioning or warm-up mode to prepare the vehicle for operation at a predetermined ready time such as for example at the start of a shift based on the temperature of the coolant from temperature sensor 62. In this implementation, the vehicle preconditioning system 110 may assume that the engine oil is at or has also reached an acceptable temperature when the coolant reaches its predetermined temperature at the predetermined ready time.

In a further implementation using the coolant and oil temperature sensors 62, 64, the vehicle preconditioning system 110 in operable communication with the controller 60 may operate engine cooling system 40 in the preconditioning or warm-up mode to prepare the vehicle for operation at a predetermined ready time such as for example at the start of a shift based on the temperature of the coolant from temperature sensor 62. In this implementation, the vehicle preconditioning system 110 may determine at the predetermined ready time whether the engine oil is at or has also reached an acceptable temperature based on the temperature as determined by the third temperature sensor 64. The vehicle preconditioning system may issue a warning to the operator such as for example a visual or audible warning to the operator indicating that the vehicle should be permitted to be started at the predetermined ready time, but that it is not yet ready for heavy work until the oil reaches its normal operating temperature.

In a further implementation using the coolant and oil temperature sensors 62, 64, the vehicle preconditioning system 110 in operable communication with the controller 60 may operate engine cooling system 40 in the preconditioning or warm-up mode to prepare the vehicle for operation at a predetermined ready time such as for example at the start of a shift based on a desired temperature of transmission oil of the vehicle in combination with the temperature of the coolant from temperature sensor 62. In this implementation, the vehicle preconditioning system 110 may determine based on a reading obtained from the temperature sensors 62, 64 that the engine may be started so that the engine operation may in turn be used to heat the transmission oil to a sufficient temperature for the vehicle to be ready to use at the predetermined ready time. The vehicle preconditioning system may issue a warning to the operator such as for example a visual or audible warning to the operator indicating that, although the engine of the vehicle is operating, the vehicle should not be heavily exercised until the transmission oil reaches its normal operating temperature.

In one implementation using the coolant and ambient air temperature sensors 62, 63, the vehicle preconditioning system 110 in operable communication with the controller 60 may operate engine cooling system 40 in the preconditioning or warm-up mode to prepare the vehicle for operation at a predetermined ready time such as for example at the start of a shift based on the temperature of the coolant from temperature sensor 62 together with the temperature of the ambient air from temperature sensor 63. In this implementation, the vehicle preconditioning system 110 may assume that the engine oil is at or has also reached an acceptable temperature when the coolant reaches its predetermined temperature at the predetermined ready time.

In a further implementation using the coolant, ambient air, and oil temperature sensors 62, 63, 64, the vehicle preconditioning system 110 in operable communication with the controller 60 may operate engine cooling system 40 in the preconditioning or warm-up mode to prepare the vehicle for operation at a predetermined ready time such as for example at the start of a shift based on the temperature of the coolant from temperature sensor 62 together with the temperature of the ambient air from temperature sensor 63. In this implementation, the vehicle preconditioning system 110 may determine at the predetermined ready time whether the engine oil is at or has also reached an acceptable temperature based on the temperature as determined by the third temperature sensor 64. The vehicle preconditioning system may issue a warning to the operator such as for example a visual or audible warning to the operator indicating that the vehicle should be permitted to be started at the predetermined ready time, but that it is not yet ready for heavy work until the oil reaches its normal operating temperature.

Figure 4:
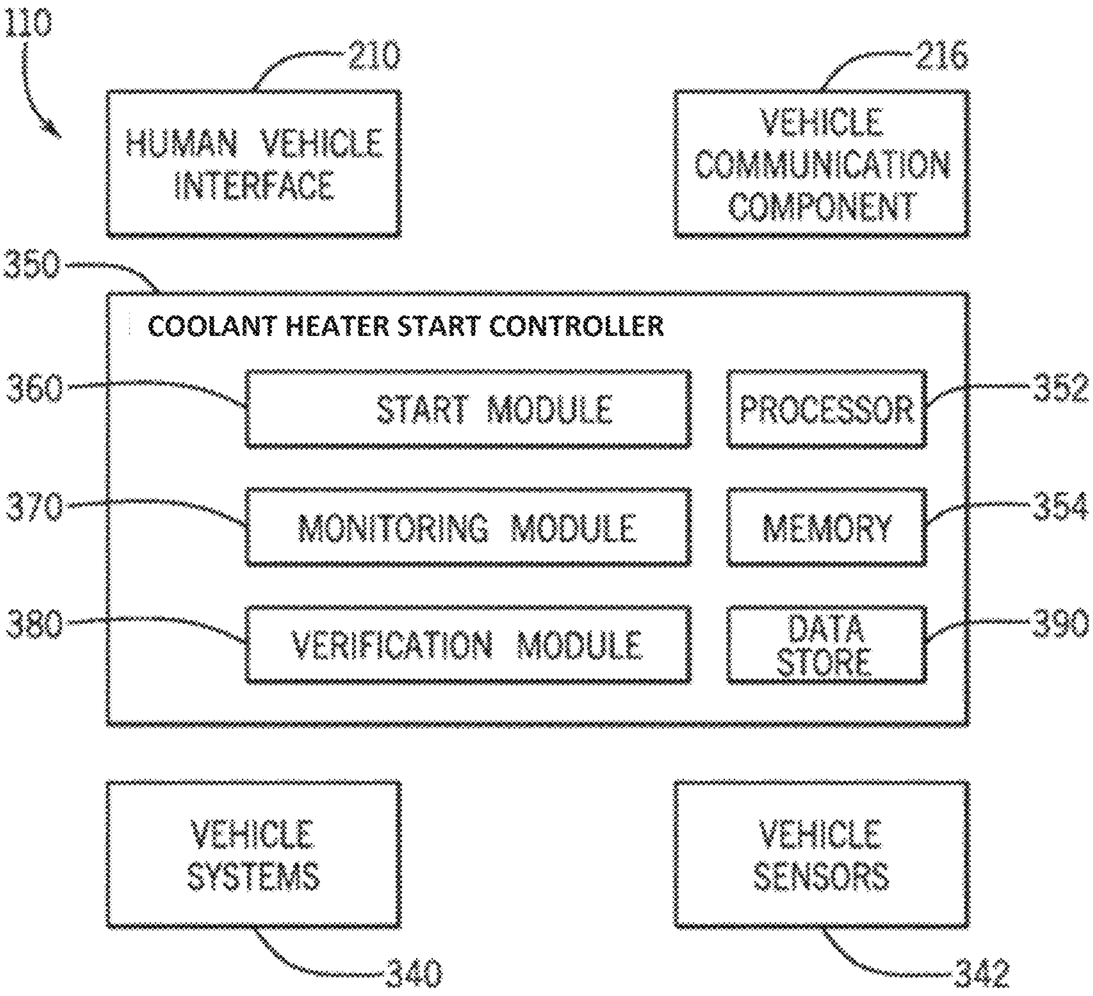
FIG. 4 is a schematic block diagram illustrating an example vehicle preconditioning system in accordance with an example embodiment.

FIG. 4 is a simplified block diagram of the vehicle preconditioning system 110. Generally, the components of the vehicle preconditioning system 110 discussed in reference to FIG. 4 are on-board the work vehicle 120 and either integrated with the vehicle controller 60 or in operative communication with the controller 60. In some embodiments, however, one or more functions may be performed on the remote operation device 130 and/or the remote center 140.

In one example, the vehicle preconditioning system 110 may be considered to include a coolant heater (DFCH) start controller 350. Generally, the coolant heater start controller 350 may control the overall operation of the vehicle preconditioning system 110 to initiate a remote start of the coolant heating device 52, either automatically or based on operator commands, and/or verifying that a remote start of the coolant heating device 52 is appropriate, either automatically or based on operator or manager commands. The coolant heater start controller 350 may be embedded within the work vehicle controller 60 discussed above or may be a stand-alone controller.

Generally, the coolant heater start controller 350 may be configured as a computing device with associated processor devices and memory architectures, as a hard-wired computing circuit, as a programmable circuit, as a hydraulic, electrical or electro-hydraulic controller, or otherwise, which are generally represented in FIG. 4 as a processor device 352. As such, the start controller 350 may be configured to execute various computational and control functionality with respect to the vehicle preconditioning system 110, e.g., as programs stored in a non-transient memory device 354.

In one embodiment, the vehicle preconditioning system 110 may be considered to include, or otherwise interact with, a human-vehicle interface 210 and a vehicle communication component 216 of the work vehicle 120. In some examples, the user interface and communications unit associated with the vehicle preconditioning system 110 may be stand-alone or dedicated components with comparable functions. The human-vehicle interface 210 generally functions to enable an operator at the work vehicle 120 to interface with the vehicle preconditioning system 110 (e.g. to input commands and data and receive data and/or to enable or disable on or more aspects of the vehicle preconditioning system 110). The vehicle communication component 216 generally functions to enable communication between the coolant heater start controller 350 and the work vehicle 120, remote operation device 130, and/or remote center 140.

The vehicle preconditioning system 110 may further be considered to include, or otherwise interact with, various work vehicle systems 340 and various work vehicle sensors 342. The vehicle systems 340 generically refers to any of the work vehicle components described above and/or work machine components generally incorporated into such work machines. Examples include the engine 16, a transmission, starter devices, the engine lubrication system 30, the engine cooling system 40, the coolant heating device 52, an exhaust treatment system, a power steering system, the hydraulic systems 158, brake assemblies, a battery assembly, a climate control system, body compartments, a lighting assembly, and the like. Similarly, the vehicle sensors 342 generically refers to any of the work machine sensors described above and/or work vehicle components generally incorporated into such work vehicles. Examples include transmission sensors, tire pressure sensors, the lubrication system temperature sensor 64, the engine cooling system temperature sensor 62, exhaust treatment system sensors, power steering system sensors, hydraulic system sensors, brake sensors, battery sensor, the ambient temperature sensors 63, location or position sensors, frame sensors, a clock, fuel sensor, image sensors, proximity sensors, and/or any other suitable sensors. Communication between the coolant heater system 110 and the vehicle systems 340 and vehicle sensors 342 may occur directly between the coolant heater system 110 and the vehicle systems 340 and the vehicle sensors 342, or indirectly between the coolant heater system 110 and the vehicle systems 340 and the vehicle sensors 342 via the vehicle controller 60.

As introduced above and described in greater detail below, the coolant heater start controller 350 may particularly be configured to implement one or more functional units or modules, including a coolant heater start module 360, a coolant heater monitoring module 370, a coolant heater verification module 380, and data store (or database) 390. As can be appreciated, the modules shown in FIG. 4 may be combined and/or further partitioned to similarly operate according to the functions described herein.

Generally, the coolant heater start module 360 may be provided to control various aspects of the operation of the vehicle preconditioning system 110. The start module 360 may exchange information with the human-vehicle interface 210, vehicle communication component 216, vehicle systems 340, and/or vehicle sensors 342. The start module 360 may further initiate functions associated with the monitoring module 370 and/or verification module 380, and one or more of the modules 360, 370, 380 may retrieve or store information with data store 390.

In one embodiment, the coolant heater start module 360 may receive signals from the human-vehicle interface 210 and/or vehicle communication component 216 to enable operation of the vehicle preconditioning system 110. Operation of the preconditioning system 110 may take a number of forms. In one example, the coolant heater start module 360 initiates a monitoring or auto-start function in the monitoring module 370. The auto-start function may monitor characteristics of the work vehicle 120 when the work vehicle 120 is in an "off-state" (e.g., when no other components or no major components of the work vehicle are active). In particular, the monitoring module 370 may receive information from the vehicle sensors 342 and/or other data sources, and when the information in the form of parameter values satisfies one or more coolant heater start initiation conditions stored in data store 390, the monitoring module 370 may initiate a coolant heater start initiation command provided to the start module 360. Upon receipt of the start initiation command, the coolant heater start module 360 may generate the appropriate start actuation command for one or more of the vehicle systems 340 including for example generating an appropriate actuation command to the coolant heating device 52. In some embodiments, monitoring module 370 may continue to monitor the information from the vehicle sensors 342, and when the information satisfies one or more stop initiation conditions stored in data store 390, the monitoring module 370 may initiate a stop initiation command that may be provided to the coolant heater start module 360. Upon receipt of the stop initiation command, the coolant heater start module 360 may generate the appropriate stop command for one or more of the vehicle systems 340 including for example the coolant heating device 52.

In some embodiments, the coolant heater start module 360 may receive the start initiation command directly from a remote operation device 130 and/or remote center 140 via the vehicle communication component 216. In any event, in other embodiments, upon receipt of the start initiation command, the coolant heater start module 360 may initiate a verification function in the coolant heater verification module 380. The verification module 380 may receive information from the vehicle sensors 342 including for example the set of temperature sensors 62, 63, and 64, and when the information satisfies one or more start conditions stored in data store 390, the coolant heater verification module 380 may initiate a verification confirmation provided to the coolant heater start module 360. Upon receipt of the verification confirmation, the coolant heater start module 360 may generate the appropriate start command for one or more of the vehicle systems 340 such as for example to generate the appropriate start command for automatically controlling the coolant heating device 52 to initiate heating the engine coolant in the work vehicle. In some examples, the coolant heater verification module 380 may communicate with the remote center 140 and/or the remote operation device 130 via the vehicle communication component 216 in order to evaluate the verification conditions. Additional details and more specific implementations of the vehicle preconditioning system 110 are discussed below.

Figure 5:
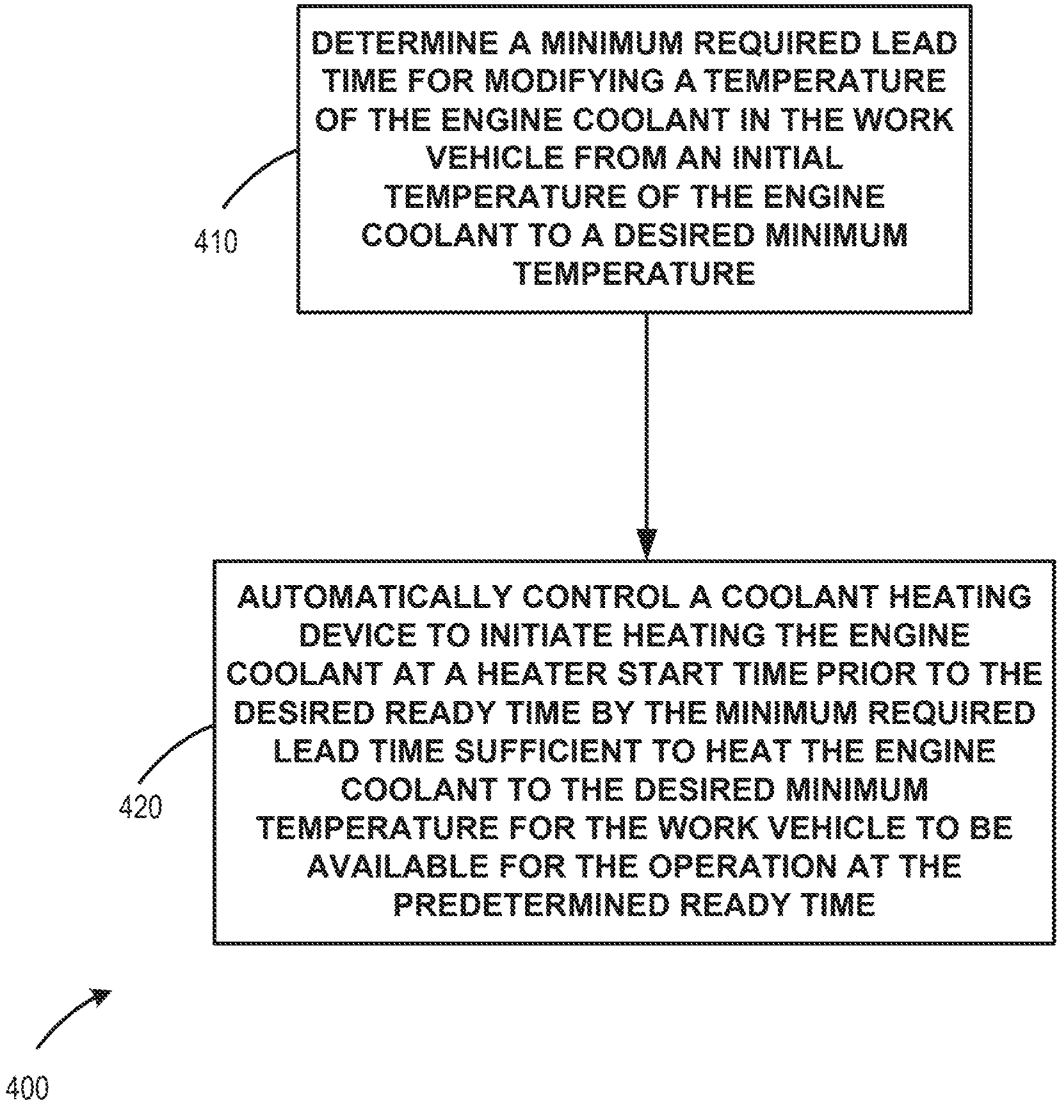
FIG. 5 is a flow diagram illustrating a method of automatically preconditioning engine coolant in a work vehicle in accordance with an example embodiment.
Figure 6:
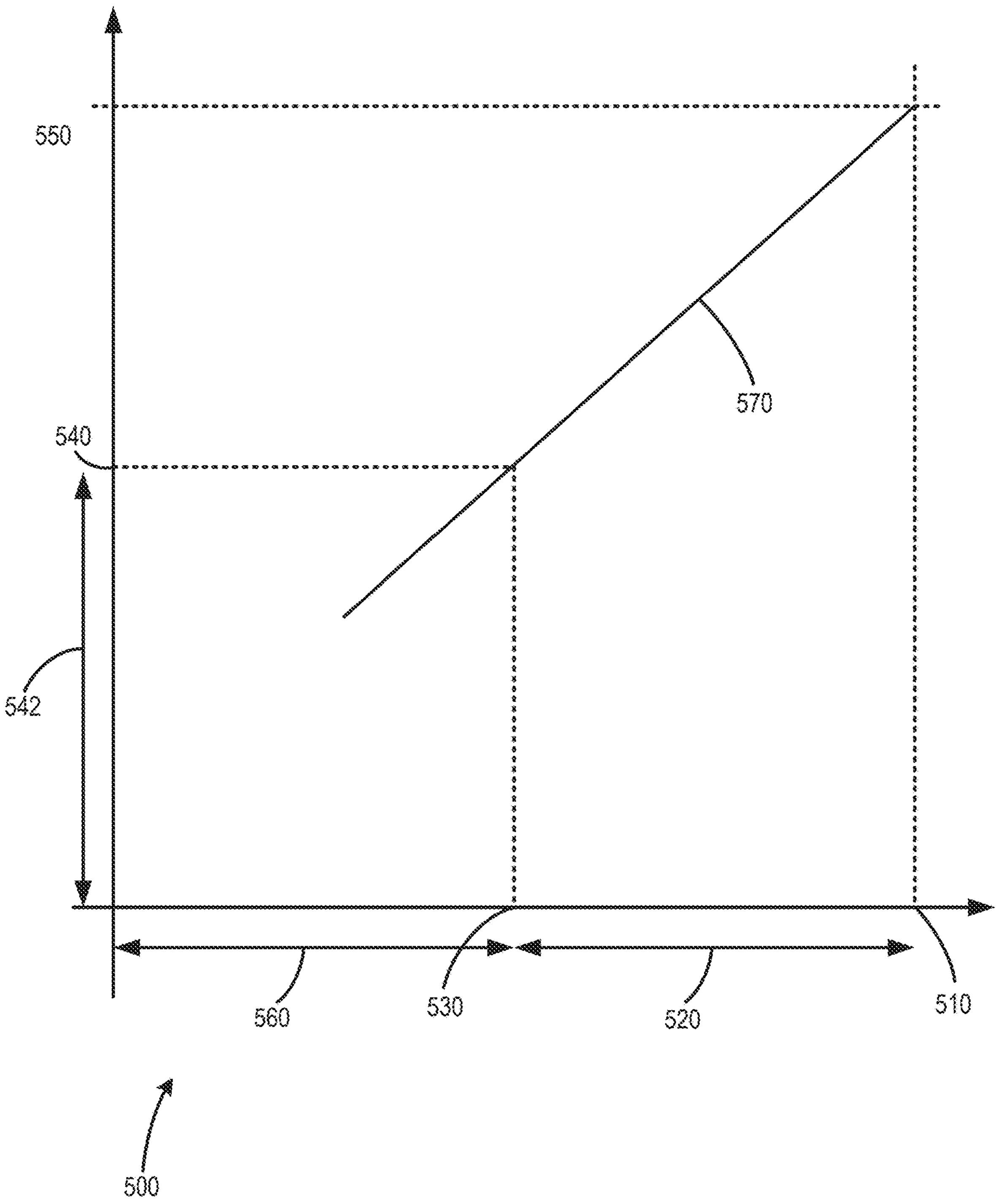
FIG. 6 is a graph representing operation of a vehicle preconditioning system to automatically precondition engine coolant in a work vehicle in accordance with an example embodiment.

FIG. 5 is a flow diagram illustrating a method 400 of automatically preconditioning engine coolant in a work vehicle in accordance with an example embodiment, and FIG. 6 is a graph 500 representing operation of a vehicle preconditioning system to automatically precondition engine coolant in a work vehicle in accordance with an example embodiment. In FIG. 6 time is represented on the horizontal axis, and temperature is represented on the vertical axis.

With reference now to those FIGURES, the method is provided for automatically preconditioning engine coolant in a work vehicle 120 for operation of the work vehicle at a predetermined ready time 510. A minimum required lead time 520 is determined at 410 of the method 400 for modifying a temperature of the engine coolant in the work vehicle 120 from an initial temperature 540 of the engine coolant to a desired minimum temperature 550. In an implementation, the minimum required lead time 520 may be determined by a processor device 352 of the vehicle preconditioning system 110.

In accordance with an implementation, the minimum required lead time 520 may be determined by a processor device 352 of the vehicle preconditioning system 110 to have or otherwise include a built-in additional lead time for accommodating compensating the system to provide for a desired minimum transmission oil temperature. By way of example, the transmission oil may take 30 minutes to be sufficiently heated after the DFCH has heated the coolant to a level where the vehicle engine may be started, and after the engine has then warmed up for a set duration, or beyond a temperature threshold. In this case the minimum required lead time 520 may be determined by a processor device 352 of the vehicle preconditioning system 110 to include a predetermined or otherwise set additional lead time component to account for the preconditioning of the desired minimum transmission oil temperature.

In accordance with an implementation and similarly, the minimum required lead time 520 may be determined by a processor device 352 of the vehicle preconditioning system 110 to have or otherwise include a built-in additional lead time for accommodating compensating the system to provide for a desired operator cab temperature. By way of example, the operator cab may take 12 minutes to be sufficiently cooled/heated after the vehicle engine has been started. In this case the minimum required lead time 520 may be determined by a processor device 352 of the vehicle preconditioning system 110 to include a predetermined or otherwise set additional lead time component to account for the preconditioning of the desired operator cab temperature.

A coolant heating device 52 is controlled at 420 to initiate heating the engine coolant at a heater start time 530 prior to the desired ready time 510 by the minimum required lead time 520 sufficient to heat the engine coolant to the desired minimum temperature 550 for the work vehicle to be available for the operation at the predetermined ready time 510.

In accordance with an implementation, ready time data may be stored in a non-transient memory device 354 (FIG. 4) operatively coupled with the processor device 352 of the vehicle preconditioning system 110, wherein the ready time data is representative of the predetermined ready time 510 for operation of the work vehicle 120. Similarly in an implementation, desired minimum temperature data may be stored in the non-transient memory device 354 of the vehicle preconditioning system 110, wherein the desired minimum temperature data is representative of the desired minimum temperature 550.

Information for controlling the coolant heating device 52 may be received by the vehicle preconditioning system 110 via the vehicle communication component 216 from multiple sources. For example and in accordance with an implementation, one or more of the ready time data and/or the desired minimum temperature data may be received from an associated source comprising one or more of an operator of the work vehicle 120 using for example the human vehicle interface 210, the remote operation device 130 in operative communication with the vehicle preconditioning system 110 via the vehicle communication component 216, and/or the remote center 140 in operative communication with the vehicle preconditioning system 110 via the vehicle communication component 216.

In an implementation, the determining the minimum required lead time includes determining, during a prelude time period 560 prior to the heater start time 530, the initial temperature 542 of the engine coolant by one or more of the coolant temperature sensor 62 and/or the ambient air temperature sensor 63 operatively coupled with the processor device 352 of the vehicle preconditioning system 100 via the work vehicle sensor component 342.

It is to be appreciated that in an implementation, automatic control of the coolant heating device 52 may be deferred during the prelude time period 560 to initiate the heating the engine coolant at the heater start time 530.

As mentioned above, the coolant heating device 52 is operative to heat the engine coolant of the work vehicle. In an implementation, thermal energy generated by the exothermic combustion reaction in combustion chamber 72 of an example coolant heating device is transferred to the coolant in coolant heating chamber 84 to heat the coolant. This being the case, there is a power transfer relationship 570 between the engine coolant in the work vehicle and the coolant heating device 52. In general, the power transfer relationship 570 is representative of a time rate of energy transferred from the coolant heating device 52 to the engine coolant in the work vehicle 120 during operation of the coolant heating device 52.

In accordance with an example implementation of the method 400, the minimum required lead time may be determined at 410 based on a difference between the desired minimum temperature 550 and the initial temperature 540, 542, and a power transfer relationship 570 between the engine coolant in the work vehicle 120 and the coolant heating device 52.

In accordance with an example implementation of the method 400, the minimum required lead time may be determined at 410 based on a difference between the desired minimum temperature 550 and the initial temperature 540, 542, and a linear power transfer relationship 570 between the engine coolant in the work vehicle 120 and the coolant heating device 52.

In accordance with an example implementation of the method 400, the minimum required lead time may be determined at 410 based on a difference between the desired minimum temperature 550 and the initial temperature 540, 542, and a non-linear power transfer relationship (not shown) between the engine coolant in the work vehicle 120 and the coolant heating device 52.

It is to be appreciated that power transfer relationship data may be stored in the non-transient memory device 354, wherein the power transfer relationship data is representative of the power transfer relationship 570 between the engine coolant in the work vehicle 120 and the coolant heating device 52.

It is further to be appreciated that linear power transfer relationship data may be stored in the non-transient memory device 354, wherein the linear power transfer relationship data is representative of the linear power transfer relationship 570 between the engine coolant in the work vehicle 120 and the coolant heating device 52.

It is still further to be appreciated that non-linear power transfer relationship data may be stored in the non-transient memory device 354, wherein the non-linear power transfer relationship data is representative of a non-linear power transfer relationship (not shown) between the engine coolant in the work vehicle 120 and the coolant heating device 52.

As mentioned above, in some implementations, the coolant heating device 52 is operative to heat the engine coolant of the work vehicle at various discrete or controllable heating levels of operation. In this regard the method 400 may include determining, at the desired ready time 510, that the engine coolant in the work vehicle has reached the desired minimum temperature 550. Then, based on determining that the engine coolant in the work vehicle has reached the desired minimum temperature 550, the coolant heating device 52 may be controlled to operate at a controlled heating level of operation to maintain the engine coolant in the work vehicle nominally at the desired minimum temperature 550. This is beneficial when the work crew isn't ready to start a work shift at the designated ready time 510. In this case the engine coolant isn't heated above and/or beyond the predetermined desired minimum temperature 500, thus increasing efficiency by saving energy and the like.

It is to be appreciated that control of the heating level of operation of the coolant heating device 52 is not only useful after the engine coolant has reached the desired minimum temperature 500 as described above, but it is also useful before the start of a coolant heating cycle. In this regard a heating level of operation of the coolant heating device 52 may be selected based on one or more of a current time 560, the predetermined ready time 510, the initial temperature of the engine coolant 540, and/or the desired minimum temperature of the engine coolant 550. The selection of the heating level of operation of the coolant heating device 52 effectively sets or otherwise determines the power transfer relationship 570 between the engine coolant in the work vehicle and the coolant heating device 52. More particularly, the selection of the heating level of operation of the coolant heating device 52 effectively sets or otherwise determines the slope of the line representation of the power transfer relationship 570 shown in FIG. 6 between the engine coolant in the work vehicle and the coolant heating device 52.

In accordance with the above, therefore, the determining the minimum required lead time in 410 of the method 400 includes determining the minimum required lead time 520 based on a difference between the desired minimum temperature 550 of the engine coolant in the work vehicle and the initial temperature 540, 542 of the engine coolant in the work vehicle, and a power transfer relationship 570 between the engine coolant in the work vehicle and the coolant heating device in the selected heating level of operation. The power transfer relationship 570 in this implementation is representative of a time rate of energy transferred from the coolant heating device 52 to the engine coolant in the work vehicle with the coolant heating device 52 being operated while in the selected heating level of operation.

As described above, in the preconditioning or warm-up mode, the liquid coolant may be circulated from engine 16, through a third conduit 50, through a coolant heating device 52, through a fourth conduit 54, and back to engine 16. The coolant may be heated in coolant heating device 52 and then returned to engine 16 to also heat engine 16. In this regard, the coolant heating device is used in the implementations herein to automatically heat and circulate the coolant of the work vehicle through engine 16 via the conduits 50, 54 for preparing the vehicle for use. In an implementation, the coolant heating device 52 is automatically controlled, by the processor device 352 of the vehicle preconditioning system 110, to circulate the engine coolant at the heater start time 530 between the coolant heating device 52 and the engine 16 of the work vehicle 120 via the plurality of engine coolant conduits 50, 54 operatively coupling the coolant heating device 52 with the engine 16 of the work vehicle 120.

Described implementations of the subject matter can include one or more features, alone or in combination.

The word "exemplary" is used herein to mean serving as an example, instance or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Further, at least one of A and B and/or the like generally means A or B or both A and B. In addition, the articles "a" and "an" as used in this application and the appended claims may generally be construed to mean "one or more" unless specified otherwise or clear from context to be directed to a singular form.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes," "having," "has," "with," or variants thereof are used in either the detailed description or the claims, such terms are intended to be inclusive in a manner similar to the term "comprising."

The implementations have been described, hereinabove. It will be apparent to those skilled in the art that the above methods and apparatuses may incorporate changes and modifications without departing from the general scope of this disclosure. It is intended to include all such modifications and alterations in so far as they come within the scope of the appended claims or the equivalents thereof.

What is claimed is:

1. A vehicle preconditioning system operable to automatically precondition engine coolant in a work vehicle, the vehicle preconditioning system:

a coolant heating device coupled with an engine of the work vehicle via a supply conduit and a return conduit, wherein engine coolant is circulated between the coolant heating device and the engine via the supply and return conduits;

a coolant temperature sensor operable to determine an initial temperature of the engine coolant in the work vehicle; and a coolant heater start controller comprising a start module in operative communication with the coolant heating device and the coolant temperature sensor, a processor device, a non-transient memory device in operative communication with the processor device, and vehicle preconditioning logic stored in the non-transient memory device, wherein the processor device is operable to execute the vehicle preconditioning logic to:

determine a minimum required lead time for modifying the temperature of the engine coolant in the work vehicle from the initial temperature to a desired minimum temperature based on:

a difference between the desired minimum temperature and the initial temperature; and a power transfer relationship between the engine coolant in the work vehicle and the coolant heating device, the power transfer relationship being representative of a time rate of energy transferred from the coolant heating device to the engine coolant during operation of the coolant heating device; and automatically control the coolant heating device to initiate heating the engine coolant at a heater start time prior to a desired ready time by the minimum required lead time sufficient to heat the engine coolant to the desired minimum temperature for the work vehicle to be available for operation at the desired ready time.

2. The vehicle preconditioning system according to claim 1, further comprising:

ready time data stored in the non-transient memory device operatively coupled with the processor device of the vehicle preconditioning system, the ready time data being representative of the desired ready time for operation of the work vehicle; and desired minimum temperature data stored in the non-transient memory device of the vehicle preconditioning system, the desired minimum temperature data being representative of the desired minimum temperature.

3. The vehicle preconditioning system according to claim 2, further comprising:

a vehicle communication component configured to receive one or more of the ready time data and/or the desired minimum temperature data from an associated source comprising one or more of:

an operator of the work vehicle;

a remote operation device in operative communication with the vehicle preconditioning system; and/or a remote center in operative communication with the vehicle preconditioning system.

4. The vehicle preconditioning system according to claim 1, wherein the processor device is operable to execute vehicle preconditioning logic to determine the minimum required lead time by:

determining, during a prelude time period prior to the heater start time, the initial temperature of the engine coolant by one or more of a coolant temperature sensor and/or an ambient air temperature sensor operatively coupled with the processor device of the vehicle preconditioning system.

5. The vehicle preconditioning system according to claim 4, wherein the processor device is operable to execute vehicle preconditioning logic to:

defer the automatic control of the coolant heating device during the prelude time period to initiate the heating the engine coolant at the heater start time.

6. The vehicle preconditioning system according to claim 1, wherein the processor device is operable to execute vehicle preconditioning logic to:

determine, at the desired ready time, that the engine coolant in the work vehicle has reached the desired minimum temperature; and based on determining that the engine coolant in the work vehicle has reached the desired minimum temperature, control the coolant heating device to operate at a controlled heating level of operation to maintain the engine coolant in the work vehicle nominally at the desired minimum temperature.

7. The vehicle preconditioning system according to claim 1, wherein the processor device is operable to execute vehicle preconditioning logic to:

select a heating level of operation of the coolant heating device based on one or more of a current time, the desired ready time, the initial temperature of the engine coolant, and/or the desired minimum temperature of the engine coolant, wherein the determining the minimum required lead time comprises determining the minimum required lead time based on:

a power transfer relationship between the engine coolant in the work vehicle and the coolant heating device in the selected heating level of operation, the power transfer relationship being representative of a time rate of energy transferred from the coolant heating device to the engine coolant in the work vehicle with the coolant heating device being operated while in the selected heating level of operation.

8. The vehicle preconditioning system according to claim 7, wherein the processor device is operable to execute vehicle preconditioning logic to:

determine, at the desired ready time, that the engine coolant in the work vehicle has reached the desired minimum temperature; and based on determining that the engine coolant in the work vehicle has reached the desired minimum temperature, control the coolant heating device to operate at a controlled heating level of operation to maintain the engine coolant in the work vehicle nominally at the desired minimum temperature.

9. The vehicle preconditioning system according to claim 1, wherein the processor device is operable to execute vehicle preconditioning logic to:

automatically control the coolant heating device by automatically controlling, by the processor device of the vehicle preconditioning system, the coolant heating device to circulate the engine coolant at the heater start time between the coolant heating device and an engine of the work vehicle via a plurality of engine coolant conduits operatively coupling the coolant heating device with the engine of the work vehicle.

10. A method of automatically preconditioning engine coolant in a work vehicle the method comprising:

determining, by a processor device of a vehicle preconditioning system, a minimum required lead time for modifying a temperature of the engine coolant in the work vehicle from an initial temperature to a desired minimum temperature based on:

a difference between the desired minimum temperature and the initial temperature; and a power transfer relationship between the engine coolant in the work vehicle and a coolant heating device, the power transfer relationship being representative of a time rate of energy transferred from the coolant heating device to the engine coolant during operation of the coolant heating device; and automatically controlling the coolant heating device to initiate heating the engine coolant to heat the engine coolant at a heater start time prior to a desired ready time by the minimum required lead time sufficient to heat the engine coolant to the desired minimum temperature for the work vehicle to be available for operation at the desired ready time.

11. The method according to claim 10, further comprising:

storing ready time data in a non-transient memory device operatively coupled with the processor device of the vehicle preconditioning system, the ready time data being representative of the desired predetermined ready time for operation of the work vehicle; and storing desired minimum temperature data in the non-transient memory device of the vehicle preconditioning system, the desired minimum temperature data being representative of the desired minimum temperature.

12. The method according to claim 11, further comprising:

receiving, by the processor device of the vehicle preconditioning system, one or more of the ready time data and/or the desired minimum temperature data from an associated source comprising one or more of:

an operator of the work vehicle;

a remote operation device in operative communication with the vehicle preconditioning system; and/or a remote center in operative communication with the vehicle preconditioning system.

13. The method according to claim 10, wherein:

the determining the minimum required lead time comprises:

determining, during a prelude time period prior to the heater start time, the initial temperature of the engine coolant by one or more of a coolant temperature sensor and/or an ambient air temperature sensor operatively coupled with the processor device of the vehicle preconditioning system.

14. The method according to claim 13, further comprising:

deferring the automatically controlling the coolant heating device during the prelude time period to initiate the heating the engine coolant at the heater start time.

15. The method according to claim 10, further comprising:

determining, at the desired ready time, that the engine coolant in the work vehicle has reached the desired minimum temperature; and based on determining that the engine coolant in the work vehicle has reached the desired minimum temperature, controlling the coolant heating device to operate at a controlled heating level of operation to maintain the engine coolant in the work vehicle nominally at the desired minimum temperature.

16. The method according to claim 10, further comprising:

selecting a heating level of operation of the coolant heating device based on one or more of a current time, the desired ready time, the initial temperature of the engine coolant, and/or the desired minimum temperature of the engine coolant, wherein the determining the minimum required lead time comprises determining the minimum required lead time based on:

a difference between the desired minimum temperature of the engine coolant in the work vehicle and the initial temperature of the engine coolant in the work vehicle; and a power transfer relationship between the engine coolant in the work vehicle and the coolant heating device in the selected heating level of operation, the power transfer relationship being representative of a time rate of energy transferred from the coolant heating device to the engine coolant in the work vehicle with the coolant heating device being operated while in the selected heating level of operation.

17. The method according to claim 16, further comprising:

determining, at the desired ready time, that the engine coolant in the work vehicle has reached the desired minimum temperature; and based on determining that the engine coolant in the work vehicle has reached the desired minimum temperature, controlling the coolant heating device to operate at a controlled heating level of operation to maintain the engine coolant in the work vehicle nominally at the desired minimum temperature.

18. The method according to claim 10, wherein:

the automatically controlling the coolant heating device comprises automatically controlling, by the processor device of the vehicle preconditioning system, the coolant heating device to circulate the engine coolant at the heater start time between the coolant heating device and an engine of the work vehicle via a plurality of engine coolant conduits operatively coupling the coolant heating device with the engine of the work vehicle.

* * * * *